(12) United States Patent
Han et al.

(10) Patent No.: US 10,749,151 B2
(45) Date of Patent: Aug. 18, 2020

(54) POUCH-TYPE RECHARGEABLE BATTERY

(71) Applicant: SAMSUNG SDI CO., LTD., Yongin-si, Gyeonggi-do (KR)

(72) Inventors: Juhyeong Han, Yongin-si (KR); Junwon Suh, Yongin-si (KR); Jandee Kim, Yongin-si (KR); Junggyu Nam, Yongin-si (KR); Wonkyu Bang, Yongin-si (KR); Juhee Sohn, Yongin-si (KR); Hyunhwa Song, Yongin-si (KR); Jungyup Yang, Yongin-si (KR); Hyeri Eom, Yongin-si (KR); Jeongdoo Yi, Yongin-si (KR); Seungjae Lee, Yongin-si (KR); Sol Choi, Yongin-si (KR); Da-Un Han, Yongin-si (KR); Seokhun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 116 days.

(21) Appl. No.: 15/719,319

(22) Filed: Sep. 28, 2017

(65) Prior Publication Data
US 2018/0090727 A1    Mar. 29, 2018

(30) Foreign Application Priority Data

Sep. 29, 2016   (KR) .................. 10-2016-0125778

(51) Int. Cl.
*H01M 2/08* (2006.01)
*H01M 10/647* (2014.01)
*H01M 2/02* (2006.01)
*H01M 10/0525* (2010.01)

(52) U.S. Cl.
CPC ............ *H01M 2/08* (2013.01); *H01M 2/021* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2008/0206636 A1* | 8/2008 | Sanada | .................. H01M 2/00 429/185 |
| 2010/0266881 A1 | 10/2010 | You et al. | |
| 2015/0147633 A1 | 5/2015 | Ahn et al. | |

FOREIGN PATENT DOCUMENTS

| | | | |
|---|---|---|---|
| KR | 10-0968050 B1 | 7/2010 | |
| KR | 10-2011-0026099 A | 3/2011 | |
| KR | 10-2015-0110983 A | 10/2015 | |
| WO | WO 01/56096 | * 8/2001 | .............. H01M 2/08 |

OTHER PUBLICATIONS

English translation of WO 01/56096 (Year: 2001).*

* cited by examiner

*Primary Examiner* — Yoshitoshi Takeuchi
(74) *Attorney, Agent, or Firm* — Lewis Roca Rothgerber Christie LLP (57) ABSTRACT

A pouch-type rechargeable battery according to one or more exemplary embodiments includes: an electrode assembly; an exterior material receiving the electrode assembly; and a sealing portion arranged at an edge of the exterior material, and including at least one metal particle and a resin surrounding the at least one metal particle, and an area ratio of the at least one metal particle and the resin in a cross-section of the sealing portion cut along a direction that is perpendicular to a lengthwise direction of the sealing portion is from 1:99 to 6:4.

13 Claims, 12 Drawing Sheets

POUCH-TYPE RECHARGEABLE BATTERY

CROSS-REFERENCE TO RELATED APPLICATION

This application claims priority to and the benefit of Korean Patent Application No. 10-2016-0125778, filed on Sep. 29, 2016 in the Korean Intellectual Property Office, the entire content of which is incorporated herein by reference.

BACKGROUND

1. Field

Aspects of embodiments of the present disclosure relate generally to a pouch-type rechargeable battery.

2. Description of the Related Art

A rechargeable battery includes an electrode assembly that includes a positive electrode, a negative electrode, and a separator disposed between the positive electrode and the negative electrode, and a case in which the electrode assembly is accommodated. The rechargeable battery may be provided as a pouch-type battery, a can-type battery, or the like depending on a shape of the case.

Recently, demand has increased for a flexible rechargeable battery as an energy source as a flexible display device has been researched and developed. Specifically, a pouch-type battery is particularly suitable for manufacturing of a thin cell and can be easily manufactured because of its simple structure, and, accordingly, the pouch-type battery is used for a flexible rechargeable battery.

However, when a conventional pouch-type battery is repeatedly bent with a constant curvature radius, the battery repeatedly receives a compressive stress and a tensile stress, thereby causing a sealed portion to be damaged. In this case, external moisture can easily enter into the battery and the moisture may cause electrolyte hydrolysis. Then, acid and heat are generated from the electrolyte hydrolysis such that adherence of the pouch is weakened and, at the same time, the performance of the battery may be deteriorated.

The above information disclosed in this Background section is only for enhancement of understanding of the background of the described technology and, therefore, it may contain information that does not form the prior art that is already known in this country to a person of ordinary skill in the art.

SUMMARY

According to an aspect of one or more embodiments of the present disclosure, a pouch-type rechargeable battery has excellent flexibility and an excellent moisture blocking characteristic.

According to one or more embodiments, a pouch-type rechargeable battery includes: an electrode assembly; an exterior material receiving the electrode assembly; and a sealing portion arranged at an edge of the exterior material, and including at least one metal particle and a resin surrounding the at least one metal particle, and an area ratio of the at least one metal particle and the resin in a cross-section of the sealing portion cut along a direction that is perpendicular to a lengthwise direction of the sealing portion is from 1:99 to 6:4.

According to an aspect of the exemplary embodiments, stability of the pouch-type rechargeable battery can be maintained even through the battery is repeatedly bent, and, at the same time, a moisture blocking characteristic of the sealing portion can be significantly enhanced.

BRIEF DESCRIPTION OF SYMBOLS

100: pouch-type rechargeable battery
11: first electrode
12: second electrode
13: separator
30, 300: sealing portion

DETAILED DESCRIPTION

The present invention will be described more fully herein with reference to the accompanying drawings, in which some exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the sizes and thicknesses of each configuration shown in the drawings may be arbitrarily shown for better understanding and ease of description, but the present invention is not limited thereto.

In addition, unless explicitly described to the contrary, the word "comprise" and variations such as "comprises" or "comprising" are to be understood to imply the inclusion of stated elements but not the exclusion of any other elements.

Figure 1:
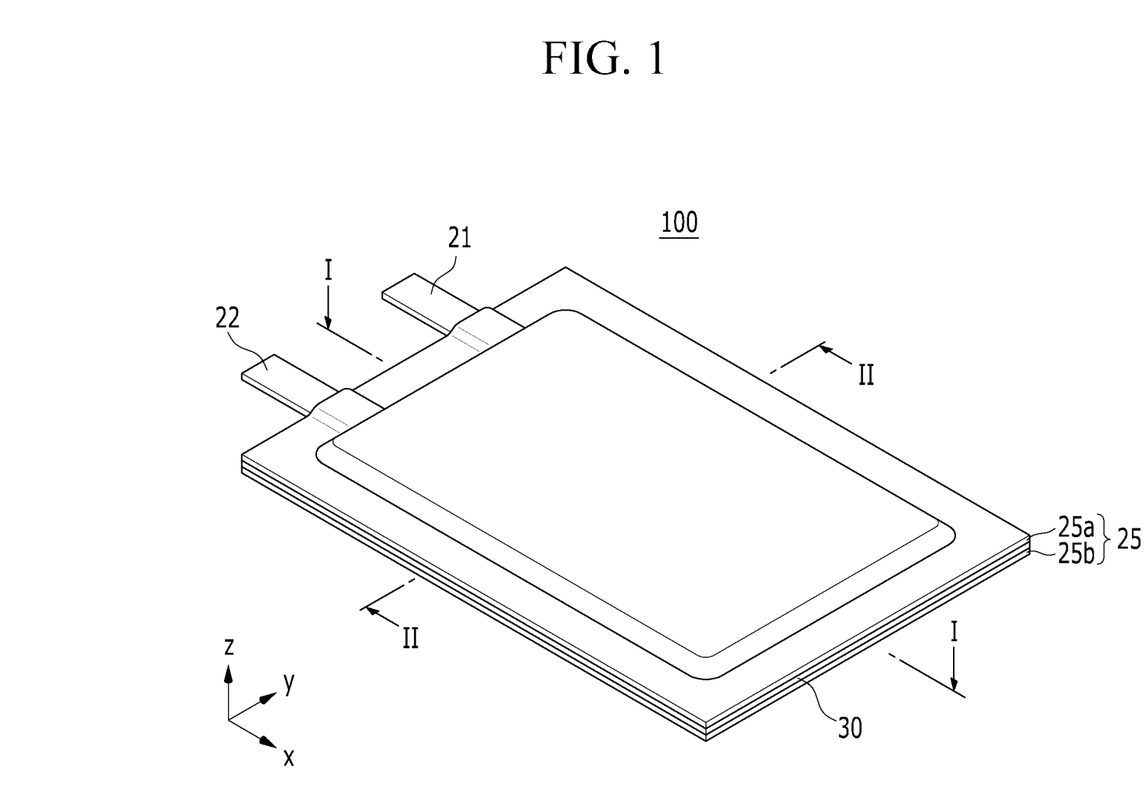
FIG. 1 is a perspective view of a pouch-type rechargeable battery according to an exemplary embodiment.
Figure 2:
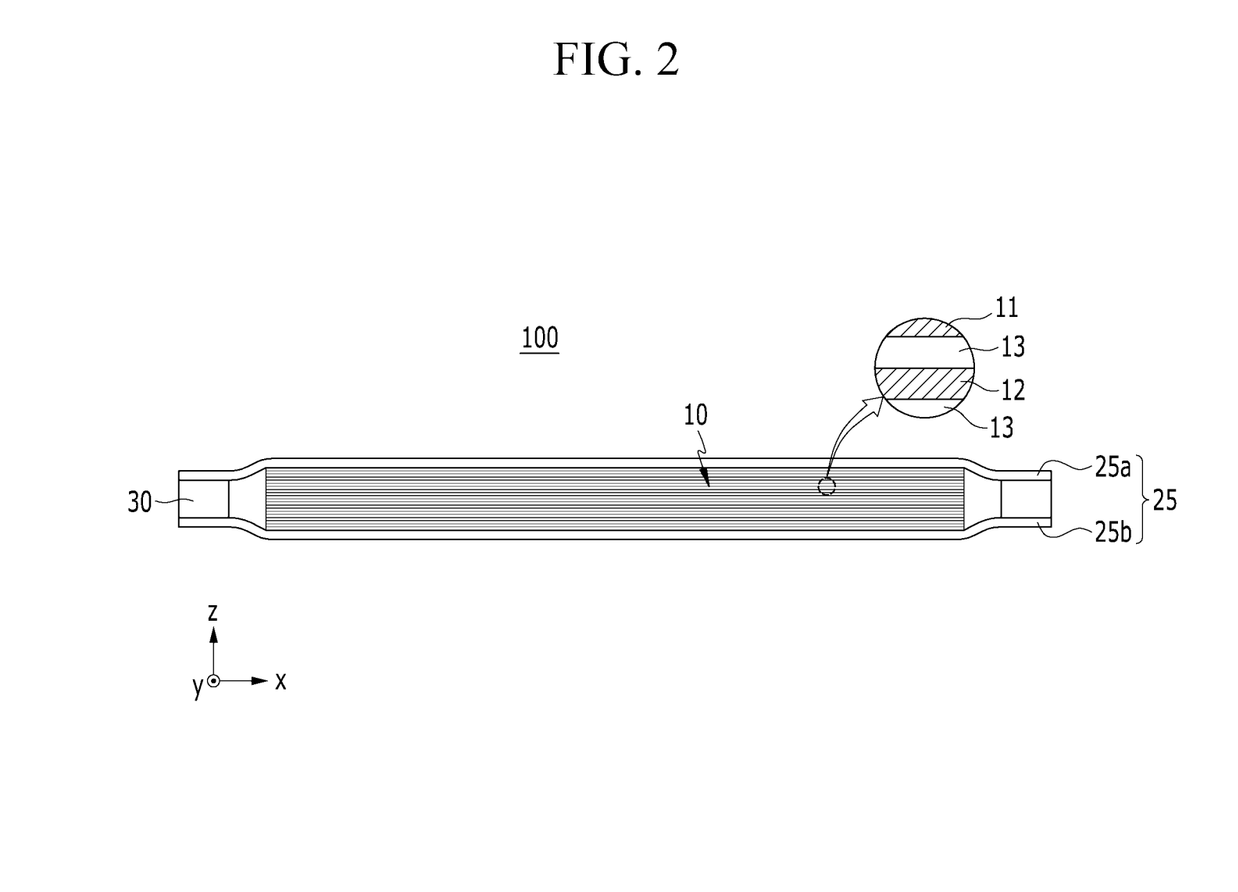
FIG. 2 is a vertical cross-sectional view of the pouch-type rechargeable battery of FIG. 1, taken along the line I-I.

FIG. 1 is a perspective view of a pouch-type rechargeable battery according to an exemplary embodiment; FIG. 2 is a vertical cross-sectional view of the pouch-type rechargeable battery of FIG. 1, taken along the line I-I in the arrow direction; and FIG. 3 is a horizontal cross-sectional view of the pouch-type rechargeable battery of FIG. 1, taken along the line II-II in the arrow direction.

Figure 3:
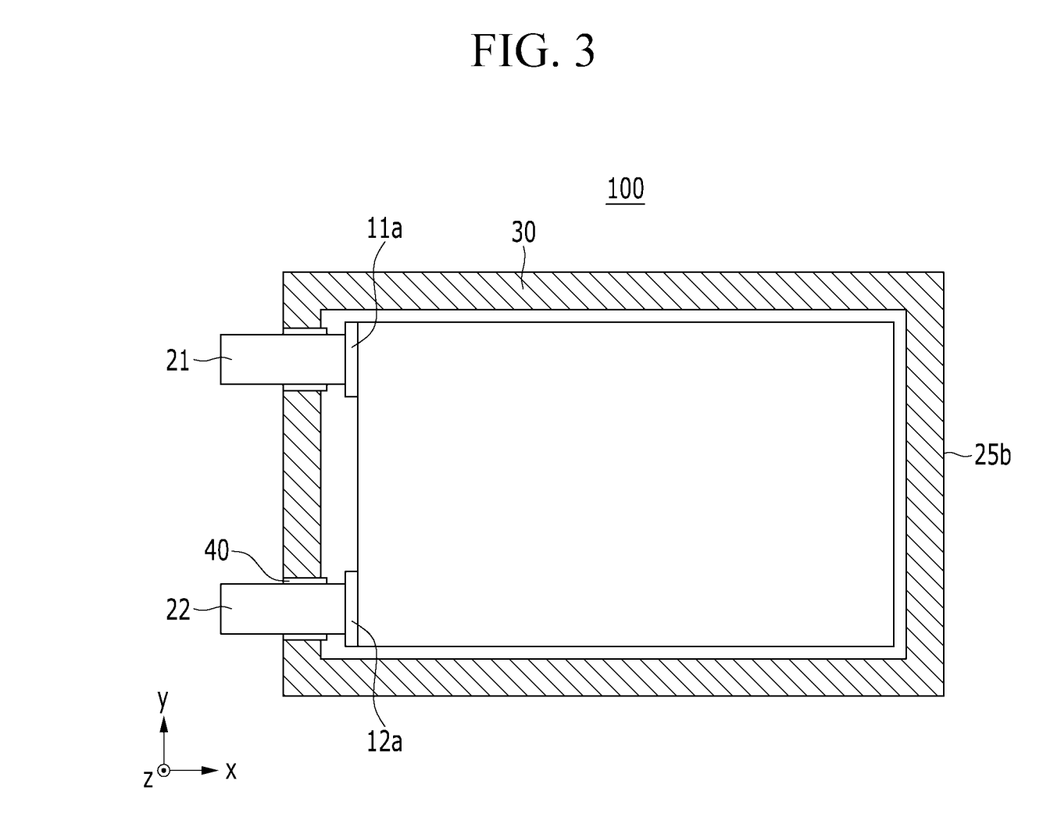
FIG. 3 is a horizontal cross-sectional view of the pouch-type rechargeable battery of FIG. 1, taken along the line II-II.

Referring to FIG. 1 to FIG. 3, a pouch-type rechargeable battery 100 according to an exemplary embodiment includes an electrode assembly 10 formed by disposing a separator 13 between a first electrode 11 (e.g., a positive electrode) and a second electrode 12 (e.g., a negative electrode), an exterior material 25 in which the electrode assembly 10 is received, a first terminal 21 (e.g., a positive terminal) electrically connected with the first electrode 11, and a second terminal 22 (e.g., a negative terminal) electrically connected with the second electrode 12.

In this case, the first terminal 21 and the second terminal 22 are coated with insulation members 40, and are drawn outside of the exterior material 25 through a bonded part. That is, the insulation members 40 electrically insulate the first and second terminals 21 and 22 from each other, and electrically insulate the first and second terminals 21 and 22 from the exterior material 25.

The first electrode 11 may be formed of a positive current collector and a positive active material layer provided on the positive current collector, and the second electrode 12 may be formed of a negative current collector and a negative active material layer formed on the negative current collector.

As the positive current collector, for example, a copper foil, a nickel foil, a stainless steel foil, a titanium foil, a nickel foam, a copper foam, a conductive polymer substrate coated with a metal, or a combination thereof may be used; however, embodiments are not restricted thereto.

In an embodiment, the positive active material layer may be formed by using a compound (e.g., a lithiated intercalation compound) that is capable of reversible intercalation and deintercalation of lithium; however, embodiments are not restricted thereto. A composition for forming the positive active material layer may further include a binder, a conductive material, and/or a thickener, in addition to the positive active material.

As the negative current collector, for example, a copper foil, a nickel foil, a stainless steel foil, a titanium foil, a nickel foam, a copper foam, a conductive polymer substrate coated with a metal, or a combination thereof may be used; however, embodiments are not restricted thereto.

The negative active material layer may be formed by using, for example, a composition that includes a material that is capable of reversible intercalation and deintercalation of lithium ions, a lithium metal, an alloy of lithium metal, a material that can dope or dedope lithium, a transition metal oxide, and the like; however, embodiments are not restricted thereto. The composition for forming the negative active material layer may further include a binder, a conductive material, and/or a thickener, in addition to the negative active material.

In an embodiment, the electrode assembly 10 may have a structure in which a plurality of first electrodes 11 and a plurality of second electrodes 12, each formed in the shape of a quadrangular sheet are alternately stacked, interposing the separator 13 therebetween. However, the present invention is not limited thereto, and the electrode assembly 10 may have a structure in which a separator is disposed between band-shaped positive and negative electrodes and then the positive electrode, the separator, and the negative electrode are spirally wound.

In an embodiment, a first uncoated region 11a (e.g., a positive uncoated region) and a second uncoated region 12a (e.g., a negative uncoated region) are provided at one end of the electrode assembly 10, and the first terminal 21 is attached to the first uncoated region 11a by welding and the second terminal 22 is attached to the second uncoated region 12a by welding.

The first electrode 11, the second electrode 12, and the separator 13 may respectively have quadrangular sheet shapes.

The separator 13 separates the first electrode 11 and the second electrode 12 and provides a movement path for lithium ions, and any separator that is typically used in a lithium battery is applicable. That is, any separator that has low resistance with respect to the ion mobility and excellent humidification ability of the electrolyte is applicable. For example, the separator 13 may be selected from glass fiber, polyester, Teflon, polyethylene, polypropylene, polytetrafluoroethylene (PTFE), or a combination thereof. The separator 13 may be a non-woven fabric or a woven fabric. In one or more embodiments, in the lithium ion battery, a polyolefin-based polymer separator such as polyethylene, polypropylene, and the like may be mainly used, a coated separator including a ceramic component or a polymer material for acquiring heat resistance and mechanical strength may be used, and a single-layered or multi-layered structure may be used.

The electrode assembly 10 is received in the exterior material 25, and is sealed by a sealing portion 30 provided along the edge of the exterior material 25.

The exterior material 25 may include an upper exterior material 25a and a lower exterior material 25b. In an embodiment, the upper exterior material 25a and the lower exterior material 25b may respectively have multi-layer structures. In an embodiment, the upper exterior material 25a and the lower exterior material 25b have a same structure and, therefore, only the structure of the upper exterior material 25a will be exemplarily described.

In an embodiment, the upper exterior material 25a may have a structure in which an external resin layer, a metal layer, and an internal resin layer are sequentially stacked.

The external resin layer serves to function as a start and protection layer. Such an external resin layer may be formed of at least one selected from the group consisting of polyethylene terephthalate, polybutylene terephthalate, polyethylene naphthalate, polybutylene naphthalate, a polyester copolymer, polycarbonate, and a nylon film, but is not limited thereto.

The metal layer may prevent or substantially prevent permeation of moisture and the like into the pouch-type rechargeable battery.

The metal layer may be made of at least one selected from the group consisting of an alloy of iron (Fe), carbon (C), chromium (Cr), and manganese (Mn), an alloy of iron (Fe), carbon (C), chromium (Cr), and nickel (Ni), or an equivalent thereof; however, embodiments are not restricted thereto.

Further, the thickness of the metal layer is preferably as thick as possible so long as flexibility of the pouch-type rechargeable battery 100 is not impaired.

The internal resin layer serves to bond the electrode assembly 10 and the exterior material 25. The internal resin layer may be made of a polyolefin or a copolymer of a polyolefin, and, in an embodiment, the polyolefin may be made of polyethylene (PE) or polypropylene (PP); however, embodiments are not restricted thereto.

As shown in FIG. 3, the sealing portion 30 is provided at the edge of the exterior material 25, and may be disposed in a manner such that a horizontal cross-section of the sealing portion 30 (i.e. a cross-section of the xy plane) forms a ring shape.

In this case, the shape with which the sealing portion 30 is disposed in the exterior material 25 may be the same as the horizontal cross-sectional shape of the pouch-type rechargeable battery 100. For example, in an embodiment, as shown in FIG. 3, the sealing portion 30 provided in the exterior material 25, which has a quadrangular-shaped horizontal cross-section, may also have a quadrangular ring shape. Although not illustrated, the sealing portion 30 may be disposed in the shape of a ring or a triangular ring, for example, depending on a horizontal cross-sectional shape of the exterior material 25; however, embodiments are not restricted thereto.

As described, when the sealing portion 30 is formed in the shape of a ring at the edge of the exterior material 25, time consumed for a sealing process can be saved. Further, the area of the sealing portion 30 can be simply and uniformly controlled, thereby assuring high process efficiency.

A conventional pouch-type battery is manufactured with a structure in which an electrode assembly is received in a pouch, that is, inside an exterior material, and an edge of an upper exterior material and an edge of a lower exterior material facing each other are directly bonded. However, when the conventional pouch-type battery is repeatedly bent with a constant curvature radius, the battery repeatedly receives a compressive stress and a tensile stress such that the exterior material may be damaged.

However, in exemplary embodiments of the present disclosure, the upper exterior material 25a and the lower exterior material 25b are bonded to each other using the sealing portion 30, which is an additional encapsulating member, and a step between a center portion where the electrode assembly 10 is disposed and an edge where the sealing portion 30 is disposed can be reduced in the pouch-type rechargeable battery 100, and, accordingly, stress that is applied to the battery when the battery is repeatedly bent can be effectively dispersed.

In this case, when the additional sealing member is made of a resin, the sealing portion may be weak to moisture such that external moisture can be easily permeated into the battery. In addition, the moisture permeated into the battery may cause electrolyte hydrolysis, and, in this case, acid and heat are generated from the electrolyte hydrolysis such that adherence of the pouch is weakened and the performance of the battery may be deteriorated.

Thus, in the pouch-type rechargeable battery 100 according to the present exemplary embodiment, the sealing portion 30 includes a metal particle and a resin that surrounds the metal particle. When such a sealing portion 30 is included, an excellent bonding characteristic of the pouch-type rechargeable battery 100 can be assured, and, at the same time, a moisture blocking characteristic can be significantly enhanced.

In an embodiment, the metal particle may include at least one selected from the group consisting of tin, zinc, copper, aluminum, nickel, silver, indium, antimony, bismuth, and an alloy thereof, for example; however, embodiments are not restricted thereto. Among the above-stated materials, copper, silver, or aluminum, in a form of a wire, are advantageous in a process, and, accordingly, copper, silver, or aluminum may be used according to one or more exemplary embodiments.

As the resin that surrounds the metal particle, for example, a thermoplastic elastomer resin may be used. In an embodiment, the resin that surrounds the metal particle may include at least one selected from the group consisting of polyethylene, polypropylene, polyurethane, and polyolefin, for example; however, embodiments are not restricted thereto. In an embodiment, a resin having excellent sealing performance, such as polyethylene and/or polypropylene, may be used.

In one or more exemplary embodiments, an area ratio of the metal particle and the resin in a vertical cross-section of the sealing portion 30 cut along a direction that is perpendicular to a lengthwise direction (i.e. the x-axis direction or the y-axis direction of FIG. 2) of the sealing portion 30 may be 1:99 to 6:4. In one or more embodiments, an area ratio of the metal particle and the resin in a vertical cross-section of the sealing portion may be 5:95 to 6:4 and, in one or more embodiments, is 8:92 to 35:65.

With reference to the vertical cross-section with respect to the lengthwise direction of the sealing portion 30, when the area ratio of the metal particle and the resin satisfies the above-described range, the flexibility of the pouch-type rechargeable battery 100 can be assured and, at the same time, the moisture blocking characteristic can be significantly improved.

In this case, a volume ratio of the metal particle and the resin with reference to the entire sealing portion 30 may be about 1:99 to 6:4. In one or more embodiments, a volume ratio of the metal particle and the resin in the sealing portion 30 and, in one or more embodiments, is 5:95 to 6:4 or 8:92 to 35:65.

With reference to the entire volume of the sealing portion 30, when the volume ratio of the metal particle and the resin satisfy the above-described range, the flexibility of the pouch-type rechargeable battery 100 can be assured and at the same time a moisture blocking characteristic can be significantly improved.

As described above, in the pouch-type rechargeable battery 100 according to the present exemplary embodiment, the sealing portion formed of metal particle and a resin that surrounds the metal particle is used as an additional sealing member to close and seal the exterior material in which the electrode assembly 10 is received, and, accordingly, stability of the pouch-type rechargeable battery 100 can be maintained even through the pouch-type rechargeable battery 100 is repeatedly bent and, at the same time, a moisture blocking characteristic can be remarkably improved.

Figure 4:
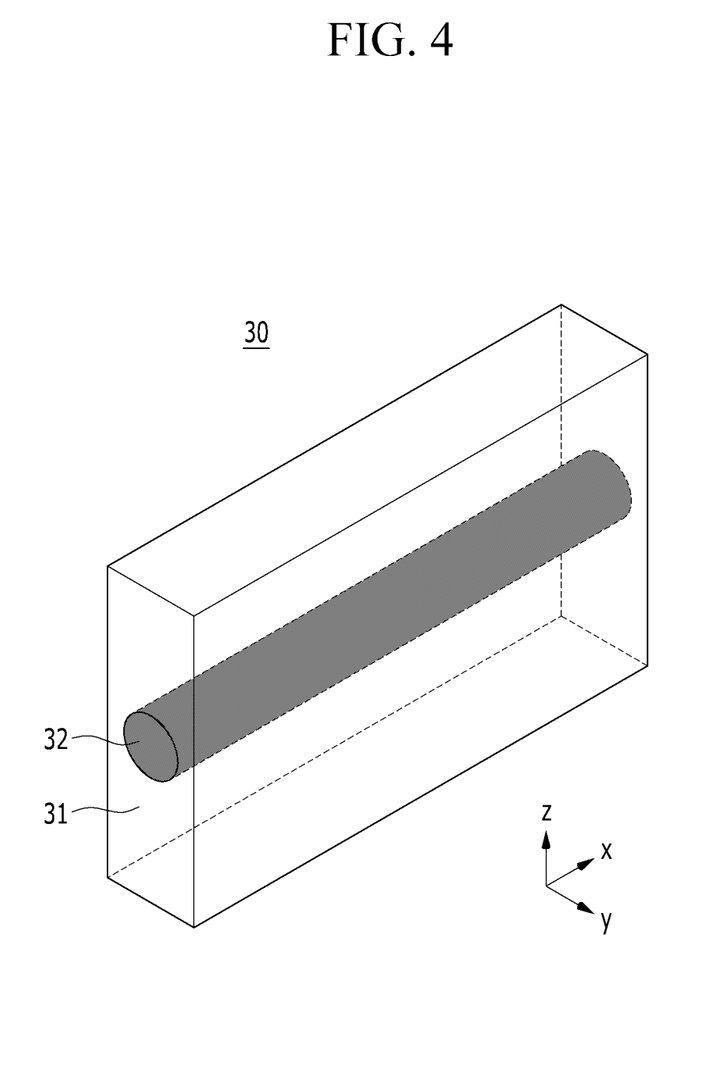
FIG. 4 to FIG. 11 exemplarily illustrate various exemplary variations of a sealing portion that can be applied to the pouch-type rechargeable battery of FIG. 1.

FIG. 4 exemplarily illustrates a sealing portion 30 that can be applied to the pouch-type rechargeable battery 100 according to an exemplary embodiment.

In addition, FIG. 5 to FIG. 11 illustrate various exemplary variations of a sealing portion that can be applied to the pouch-type rechargeable battery 100 according to exemplary embodiments.

Referring to FIG. 4 to FIG. 10, sealing portions 30, 130, 230, 330, 430, 530, and 630 according to exemplary embodiments may be formed in the shape of, for example, a quadrangular column. Thus, a vertical cross-sectional shape (i.e. a cross-section in the yz plane) with respect to a lengthwise direction of each of the sealing portions 30, 130, 230, 330, 430, 530, and 630 may be a quadrangle.

Figure 11:
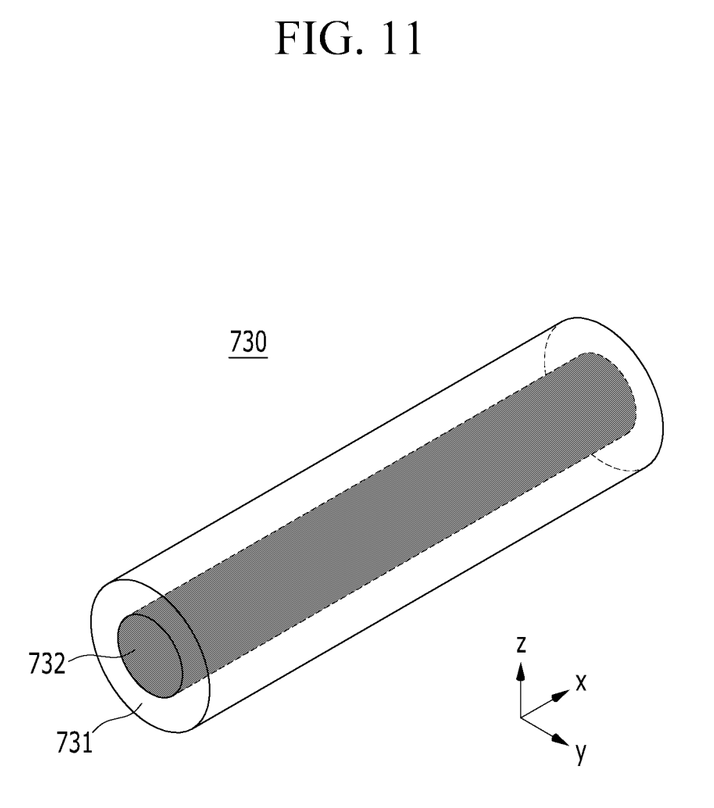

Referring to FIG. 11, a sealing portion 730 according to another exemplary embodiment may be formed in the shape of, for example, a cylinder. Thus, the shape of a vertical cross-section (i.e. a cross-section in the yz plane) with respect to the lengthwise direction of the sealing portion 730 may be a circle.

Although not illustrated, in other embodiments, a vertical cross-sectional shape of the sealing portion 30 with respect to a lengthwise direction thereof may be at least one of a polygon, an oval, and a compound shape thereof; however, the present invention is not limited thereto.

That is, the sealing portion 30 according to the present exemplary embodiment may have any of various shapes that include a metal particle 32 and a resin 31 that surrounds the metal particle 32.

Thus, the sealing portions 30, 130, 230, 330, 430, 530, 630, and 730 shown in FIG. 4 to FIG. 11 are exemplary sealing portions, including respective resins 31, 131, 231, 331, 431, 531, 631, and 731; however, the sealing portion of the present invention is not limited thereto. That is, a sealing portion of which a shape is appropriately changed can be applied as an additional member as long as the sealing portion includes a metal particle and a resin that surrounds the metal particle.

That is, referring back to FIG. 4, the sealing portion 30 includes the metal particle 32 and the resin 31 that surrounds the metal particle 32.

The metal particle 32 may have any of various shapes.

As shown in FIG. 4, FIG. 5, FIG. 8, FIG. 9, and FIG. 11, the metal particle 32 and metal particles 132, 432, 532, and 732 may have cylindrical shapes.

Figure 6:
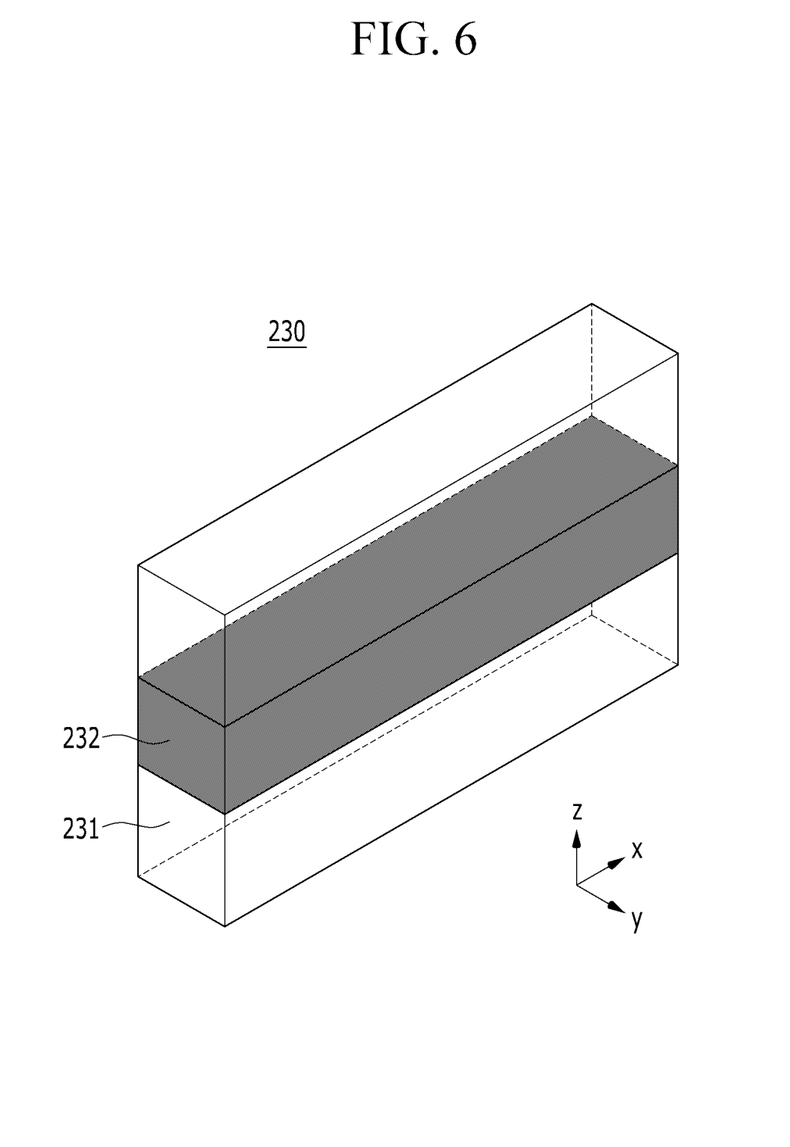
Figure 7:
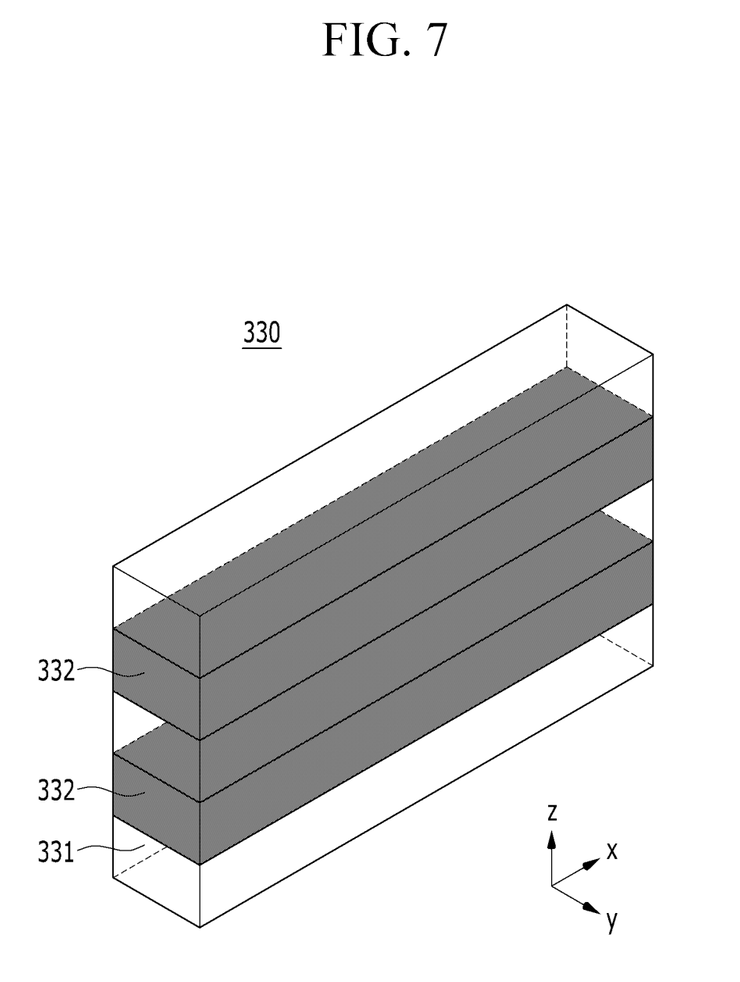
Figure 10:
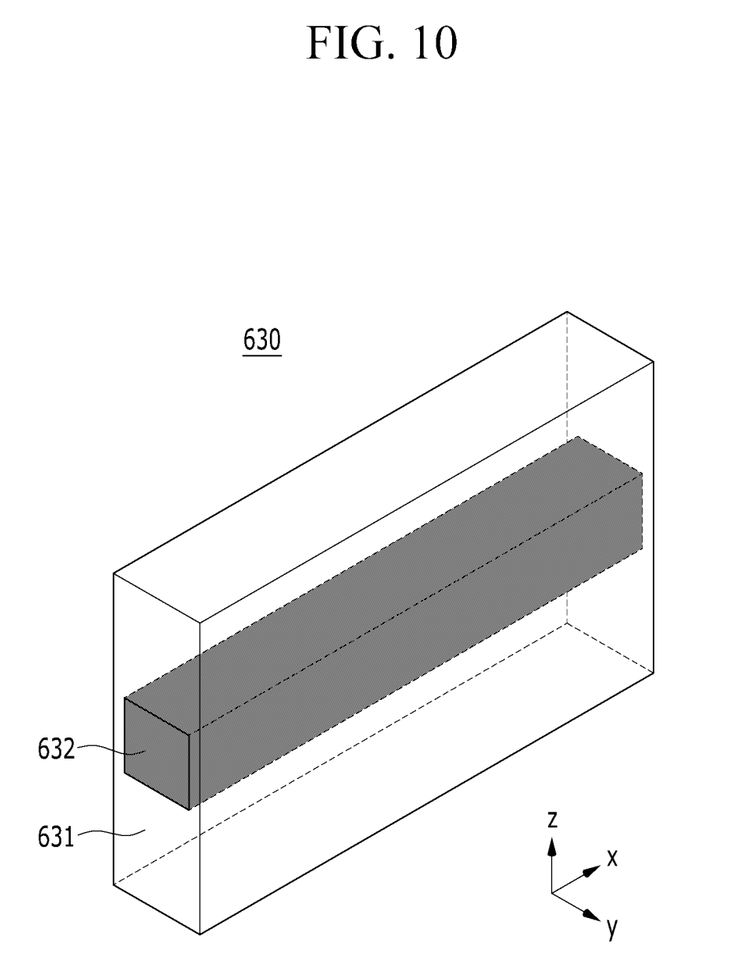

In other embodiments, as shown in FIG. 6, FIG. 7, and FIG. 10, metal particles 232, 332, and 632 may have quadrangular column shapes.

Although not illustrated, in other embodiments, a metal particle may be formed in the shape of, for example, at least one of a sphere, an oval, an elliptic cylinder, a triangular column, a polygonal column, and a compound shape thereof; however, the present invention is not limited thereto.

Referring to FIG. 4 and FIG. 8 to FIG. 11, in some exemplary embodiments, the metal particles 32, 432, 532, 632, and 732 may be provided in (e.g., entirely enclosed within) the sealing portions 30, 430, 530, 630, and 730, respectively. As described, when the metal particles 32, 432, 532, 632, and 732 are provided in the sealing portions 30, 430, 530, 630, and 730, flexibility of an electrode plate can be further improved and adherence can be enhanced.

Figure 5:
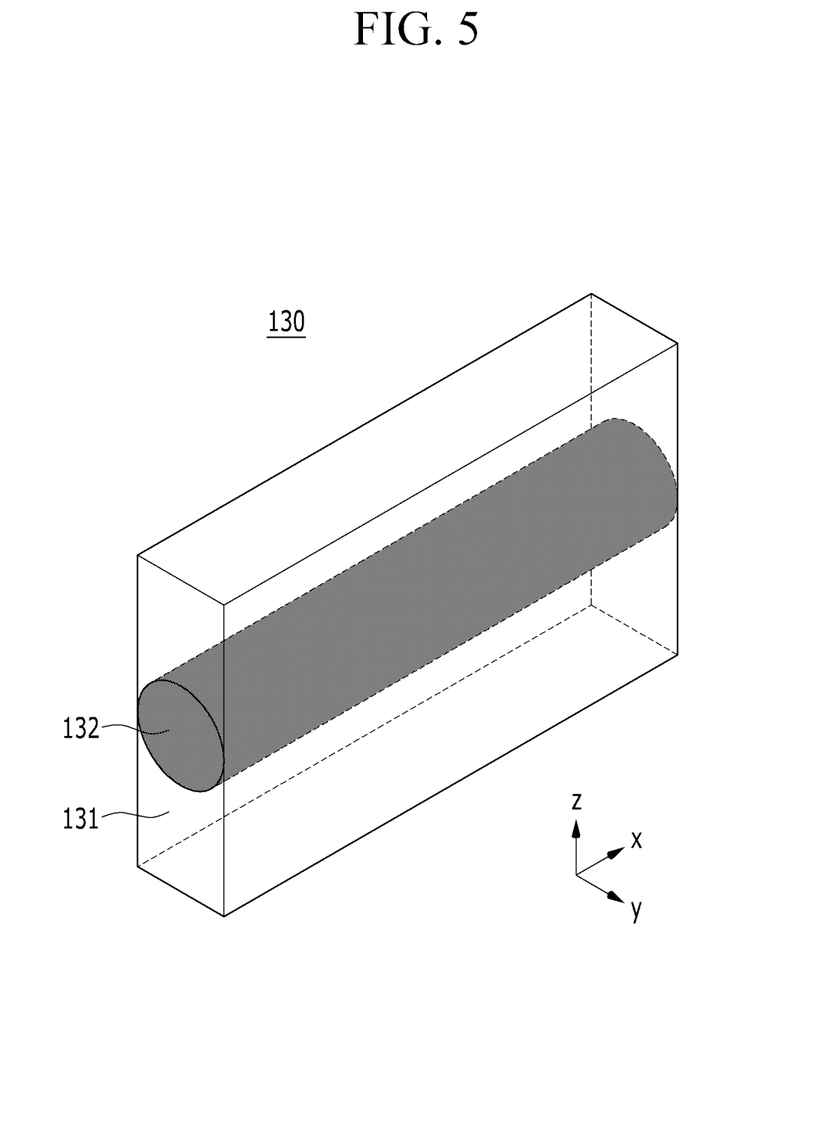

Referring to FIG. 5 to FIG. 7, in other embodiments, the metal particles 132, 232, and 332 may be disposed while being partially exposed through surfaces of the sealing portions 130, 230, and 330.

When the metal particles 132, 232, and 332 are partially exposed through the surface of the sealing portions 130, 230, and 330, the sealing portions 130, 230, and 330 may be uniformly formed in the pouch-type rechargeable battery 100 and a moisture blocking characteristic of the battery 100 can be further improved.

Figure 8:
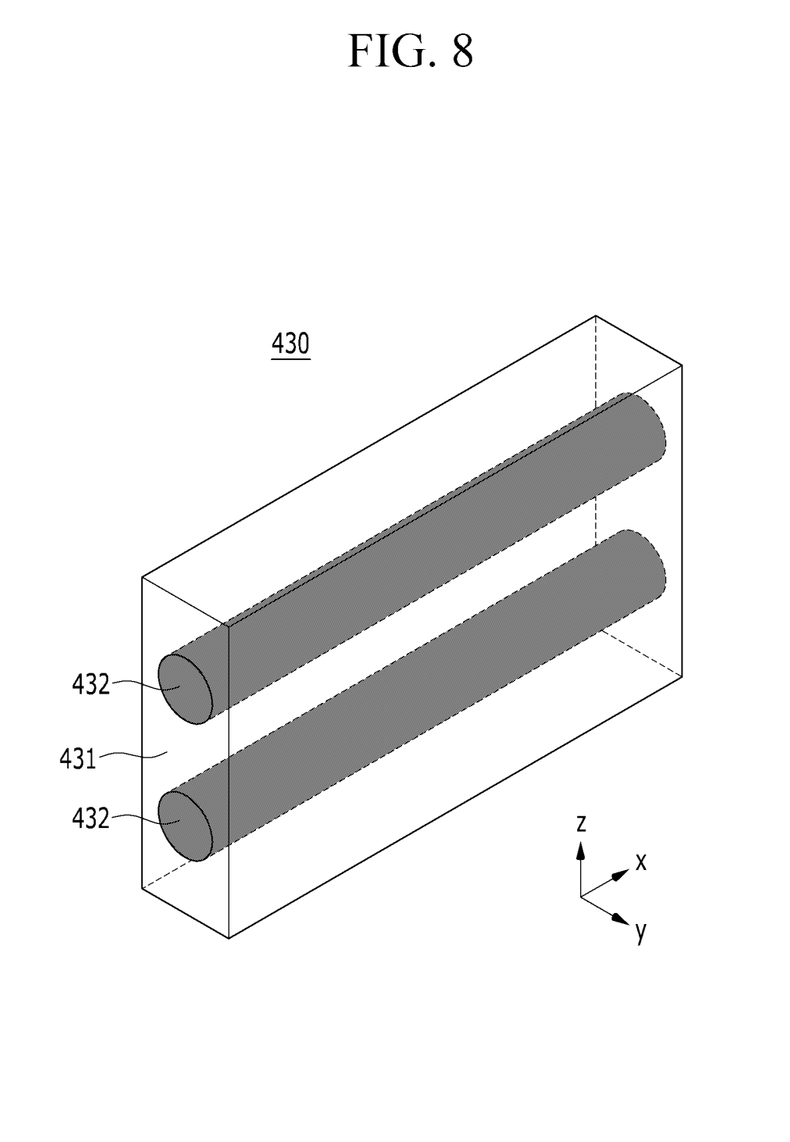
Figure 9:
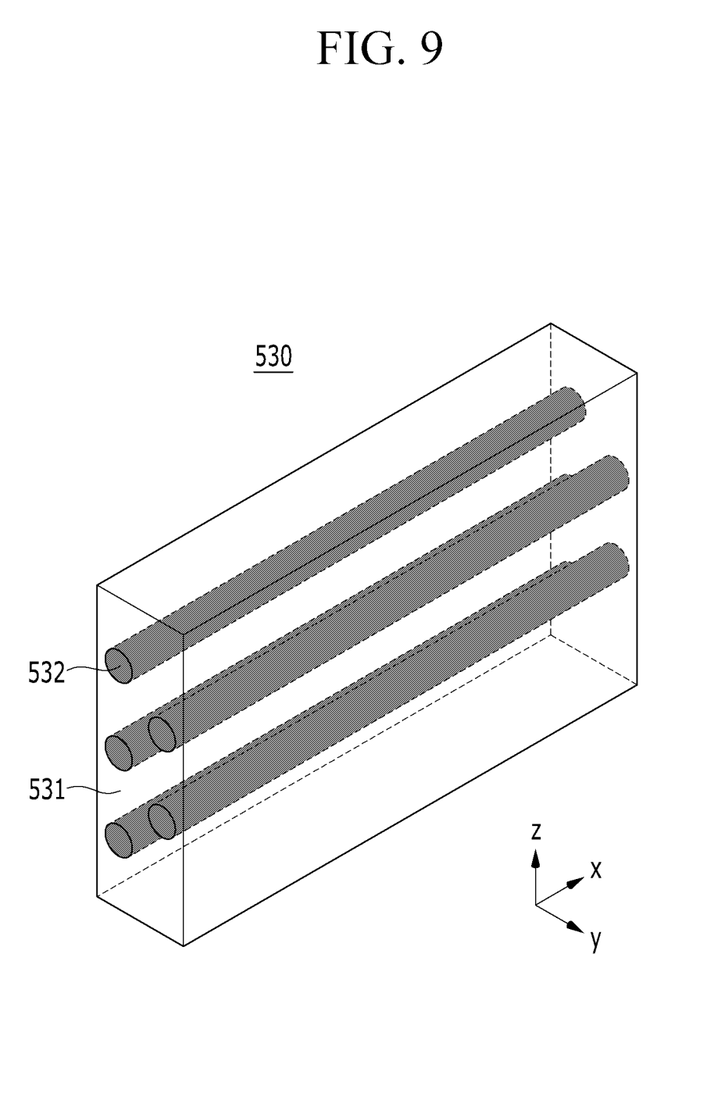

Referring to FIG. 7 to FIG. 9, the metal particles 332, 432, and 532 may be provided in plural and may be disposed at a distance from each other. As described, when the plurality of metal particles 332, 432, and 532 are provided at a distance from each other in the sealing portions 330, 430, and 530, a path through which moisture may be permeated into the pouch-type rechargeable battery 100 from the outside is increased. Thus, a moisture blocking characteristic of the rechargeable battery 100 may be further improved, and generation of pin holes or cracks in the exterior material after being repeatedly bent can be prevented or substantially prevented.

Figure 12:
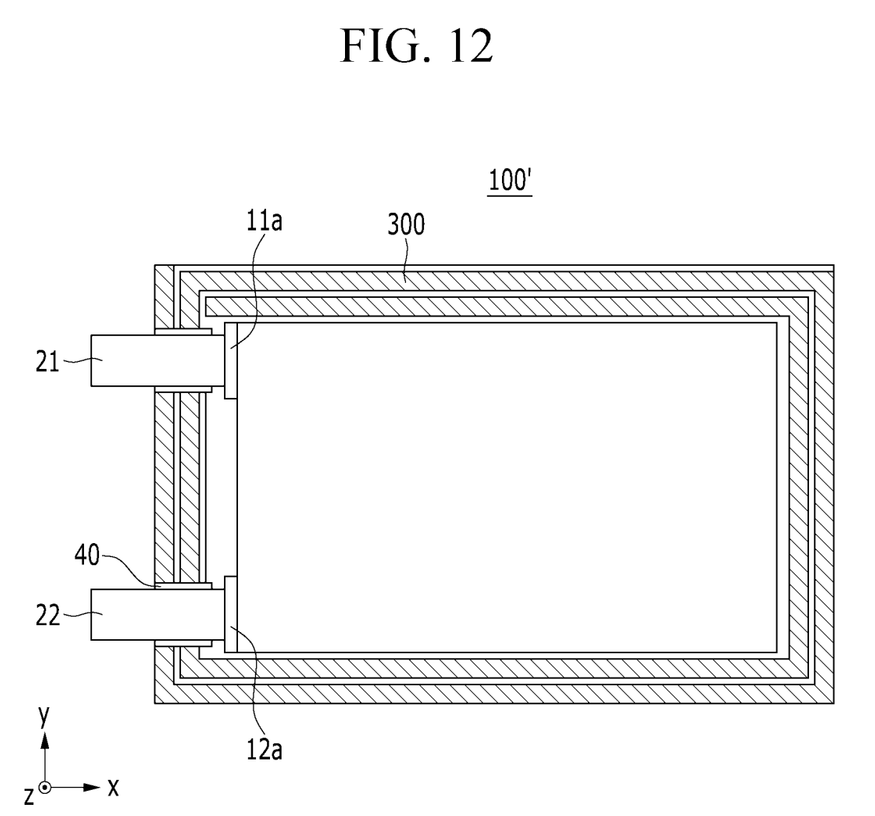
FIG. 12 is a horizontal cross-sectional view of a pouch-type rechargeable battery according to another exemplary embodiment.

FIG. 12 illustrates a horizontal cross-sectional view of a pouch-type rechargeable battery according to another exemplary embodiment.

Referring to FIG. 12, in a pouch-type rechargeable battery 100' according to another exemplary embodiment, a sealing portion 300 is provided along an edge of an exterior material, and a horizontal cross-section (i.e. a cross-section along the xy plane) may be spirally extended from an outer side to an inner side. Thus, a plurality of sealing portions 300 may be disposed at a distance from each other in one edge of the exterior material.

Various exemplary variations of a metal particle and a resin, which surrounds the metal particle, included in the sealing portion 300 may be the same as those described above with reference to FIG. 3 to FIG. 11, and, therefore, repeated description thereof will not be provided.

Further, the rechargeable battery 100' according to the present exemplary embodiment may be the same as the rechargeable battery 100 according to the exemplary embodiment described above with reference to FIG. 1 to FIG. 3, except for a manner in which the sealing portion 300 is bonded to the exterior material, and, therefore, repeated descriptions for other constituent elements thereof will not be provided.

As described, when the sealing portion 300 is formed in the shape of a spiral, a sealing member having a width that is smaller than a width of the ring-shaped sealing portion 30 may be used. Further, although a sealing member having the same structure may be used, the metal particle may occupy much more space in the spirally-shaped sealing portion 300 compared to the ring-shaped sealing portion 30, and, therefore, a moisture blocking characteristic of the sealing portion 300 can be more improved.

Herein, the present invention will be described in further detail through the following exemplary embodiments.

Exemplary Embodiment 1

A pair of exterior materials (an upper exterior material and a lower exterior material) having a structure in which an outer resin layer, a metal layer, and an inner resin layer are stacked is prepared. An electrode assembly is received between the upper exterior material and the lower exterior material, and a sealing portion such as the sealing portion of FIG. 3 is fixed to edges of the upper and lower exterior materials. In this case, a metal particle and a resin included in the sealing portion have the same structure as shown in FIG. 5, and an area ratio of the metal particle and the resin in a cross-section of the sealing portion, cut along the z-axis direction that is perpendicular to the x-axis direction, is as shown in Table 1.

Next, the sealing portion and the upper exterior material and the sealing portion and the lower exterior material are closed and sealed by a thermal welding method such that a pouch-type rechargeable battery is manufactured.

Here, a dimethyl carbonate (DMC) solvent is injected through one corner of the exterior material for a moisture permeation evaluation before the entire edges of the upper and lower exterior materials are sealed.

Exemplary Embodiments 2 to 5

Except that an area ratio of a metal particle and a resin in a cross-section of a sealing portion, cut along the z-axis direction that is perpendicular to the x-axis direction, and a structure of the sealing portion, are changed as shown in Table 1, a pouch-type rechargeable battery is manufactured using the same method of Exemplary Embodiment 1.

COMPARATIVE EXAMPLE 1

Except that a sealing portion is made of only a polypropylene resin, a pouch-type rechargeable battery is manufactured using the same method of Exemplary Embodiment 1.

TABLE 1

| Section | Metal particle:Resin (Area Ratio) | Structure of sealing portion |
|---|---|---|
| Exemplary Embodiment 1 | 35:65 | FIG. 5 |
| Exemplary Embodiment 2 | 20:80 | FIG. 6 |
| Exemplary Embodiment 3 | 20:80 | FIG. 7 |
| Exemplary Embodiment 4 | 21.8:78.2 | FIG. 8 |
| Exemplary Embodiment 5 | 8.7:91.3 | FIG. 9 |
| Comparative Example 1 | 0:100 | — |

EXPERIMENTAL EXAMPLE 1

Moisture Blocking Characteristic Evaluation

A moisture blocking characteristic is evaluated using the pouch-type rechargeable batteries according to Exemplary Embodiments 1 to 5 and Comparative Example 1.

The moisture blocking characteristic evaluation is performed by measuring the amount of moisture ($H_2O$) permeated into DMC, which is a solvent injected into the pouch-type rechargeable batteries according to Exemplary Embodiments 1 to 5 and Comparative Example 1, after storing the battery in a chamber of which a temperature is 60° C. and relative humidity is 90% for 7 days.

Specifically, the amount of moisture in the DMC solution is measured using Karl Fisher titration, and C20S equipment (manufactured by Mettler Toledo) is used. Results are shown in Table 2.

TABLE 2

| Section | Moisture permeation amount (g/m² day) |
|---|---|
| Exemplary Embodiment 1 | 0.0068 |
| Exemplary Embodiment 2 | 0.0084 |
| Exemplary Embodiment 3 | 0.0042 |
| Exemplary Embodiment 4 | 0.0060 |
| Exemplary Embodiment 5 | 0.0064 |
| Comparative Example 1 | 0.0210 |

Referring to Table 2, as described in the above-stated exemplary embodiments, in the pouch-type rechargeable battery according to Exemplary Embodiments 1 to 5 in which the sealing portion that includes a metal particle and a resin that surrounds the metal particle is applied, a moisture blocking characteristic is significantly improved compared to the pouch-type rechargeable battery according to Comparative Example 1 in which the sealing portion is made of only a resin.

While this disclosure has been described in connection with what are presently considered to be some practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A pouch-type rechargeable battery comprising:
an electrode assembly;
an exterior material comprising an upper exterior material and a lower exterior material receiving the electrode assembly therebetween, each of the upper exterior material and the lower exterior material comprising an external resin layer, a metal layer, and an internal resin layer, respectively; and
a sealing member arranged at an edge of the exterior material between the upper exterior material and the lower exterior material, and said sealing member being a physically distinct component in addition to the upper exterior material and the lower exterior material, the sealing member being spaced apart from the electrode assembly in a perimeter direction toward the edge of the exterior material and including at least one metal particle and a resin surrounding the at least one metal particle,
wherein an area ratio of the at least one metal particle and the resin in a cross-section of the sealing member cut along a direction that is perpendicular to a lengthwise direction of the sealing member is from 1:99 to 6:4.

2. The pouch-type rechargeable battery of claim 1, wherein the sealing member is arranged along the edge of the exterior material, and a horizontal cross-section of the sealing member has a shape of a ring.

3. The pouch-type rechargeable battery of claim 1, wherein the sealing member is arranged along the edge of the exterior material, and a horizontal cross-section of the sealing member spirally extends toward an inner side from an external side.

4. The pouch-type rechargeable battery of claim 1, wherein the at least one metal particle comprises at least one selected from the group consisting of tin, zinc, copper, aluminum, nickel, silver, indium, antimony, bismuth, and an alloy thereof.

5. The pouch-type rechargeable battery of claim 1, wherein the resin that surrounds the at least one metal particle comprises at least one selected from the group consisting of polyethylene, polypropylene, polyurethane, and polyolefin.

6. The pouch-type rechargeable battery of claim 1, wherein a vertical cross-sectional shape with respect to the lengthwise direction of the sealing member is at least one of a quadrangle, a polygon, a circle, an oval, and a compound shape thereof.

7. The pouch-type rechargeable battery of claim 1, wherein a shape of the at least one metal particle is at least one of a sphere, an oval, an elliptic cylinder, a triangular column, a polygonal column, and a compound shape thereof.

8. The pouch-type rechargeable battery of claim 1, wherein the at least one metal particle comprises a plurality of metal particles spaced apart at a distance from each other.

9. The pouch-type rechargeable battery of claim 1, wherein the at least one metal particle is partially exposed through at least a surface of the sealing member.

10. The pouch-type rechargeable battery of claim 1, wherein the at least one metal particle is arranged in the sealing member.

11. The pouch-type rechargeable battery of claim 10, wherein the at least one metal particle is arranged entirely within the sealing member.

12. The pouch-type rechargeable battery of claim 1, wherein a volume ratio of the at least one metal particle and the resin with reference to the sealing member is from 1:99 to 6:4.

13. The pouch-type rechargeable battery of claim 1, wherein the external resin layer, the metal layer, and the internal resin layer of each of the upper exterior material and the lower exterior material are sequentially stacked.

\* \* \* \* \*